United States Patent [19]

Chown

[11] 4,290,667
[45] Sep. 22, 1981

[54] OPTICAL FIBRE TERMINATIONS AND CONNECTORS

[75] Inventor: Martin Chown, Harlow, England

[73] Assignee: International Standard Electric Corporation, New York, N.Y.

[21] Appl. No.: 920,921

[22] Filed: Jun. 30, 1978

Related U.S. Application Data

[63] Continuation-in-part of Ser. No. 842,516, Oct. 17, 1977, abandoned, which is a continuation-in-part of Ser. No. 763,255, Jan. 26, 1977, abandoned.

[30] Foreign Application Priority Data

Feb. 3, 1976 [GB] United Kingdom ............... 04174/76
Oct. 19, 1976 [GB] United Kingdom ............... 43319/76
Jul. 5, 1977 [GB] United Kingdom ............... 28067/77

[51] Int. Cl.³ .................................................. G02B 5/14
[52] U.S. Cl. .............................. 350/96.18; 350/96.15; 350/96.20; 350/96.21; 350/413
[58] Field of Search .......... 350/96.18, 175 GN, 96.20, 350/96.21

[56] References Cited

U.S. PATENT DOCUMENTS

| | | | |
|---|---|---|---|
| 3,649,098 | 3/1972 | Suverison | 350/96.18 |
| 3,829,195 | 8/1974 | Rawson | 350/96.18 |
| 3,902,784 | 9/1975 | Dakss et al. | 350/96.21 |
| 3,944,327 | 3/1976 | Larsen | 350/96.18 |
| 3,954,338 | 5/1976 | Hennel et al. | 350/96.21 |
| 3,985,424 | 10/1976 | Steinacher | 350/96.18 |
| 4,102,559 | 7/1978 | Hanzinger | 350/96.18 |
| 4,193,664 | 3/1980 | Ellwood | 350/96.21 |

FOREIGN PATENT DOCUMENTS

| | | | |
|---|---|---|---|
| 2334969 | 7/1977 | France | 350/96.18 |
| 52-49039 | 4/1977 | Japan | 350/96.20 |
| 1429843 | 3/1976 | United Kingdom | 350/96.18 |
| 1456395 | 11/1976 | United Kingdom | 350/96.21 |

OTHER PUBLICATIONS

Y. Ueno et al., "Data Highway Using Optical Fiber Cable", Conf. on Laser & Electro Optical Sys., May 1976.

*Primary Examiner*—Stewart J. Levy
*Attorney, Agent, or Firm*—John T. O'Halloran; Thomas N. Twomey

[57] ABSTRACT

A termination for an optical fibre is formed with an integral lens for producing an expanded parallel light beam. A pair of terminations provide an optical coupler for connecting between a corresponding pair of optical fibres.

11 Claims, 20 Drawing Figures

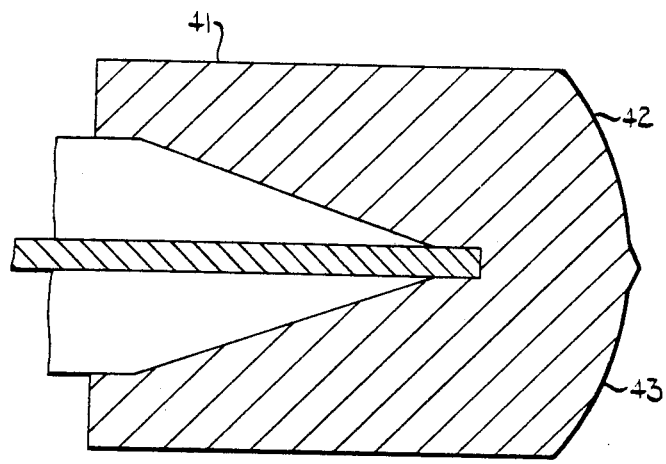
Fig_4
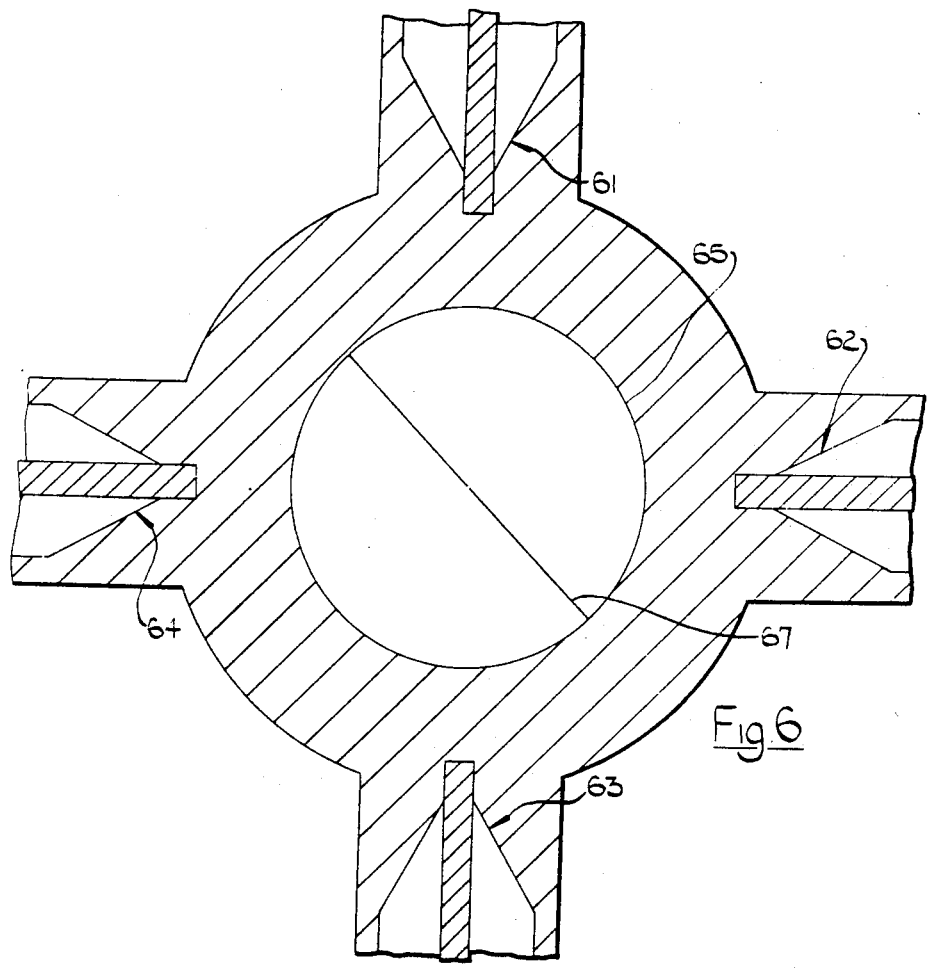
Fig_6

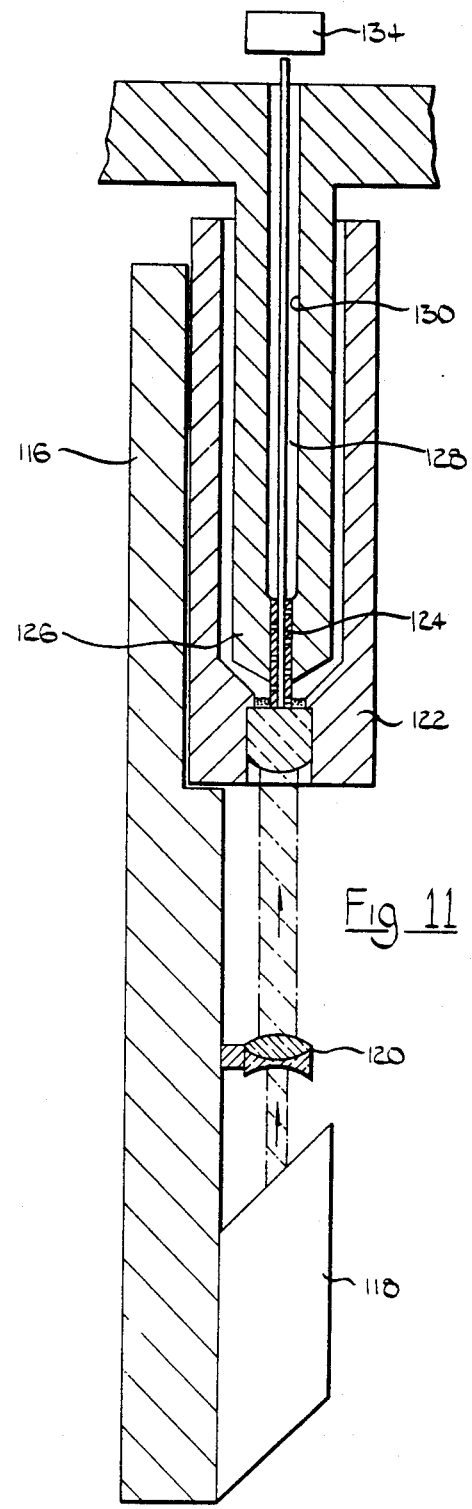

OPTICAL FIBRE TERMINATIONS AND CONNECTORS

CROSS REFERENCE TO RELATED APPLICATIONS

This is a continuation-in-part of application Ser. No. 842,516 filed Oct. 17, 1977 now abandoned which was a continuation-in-part of application Ser. No. 763,255 filed Jan. 26, 1977 now abandoned and assigned to the assignee of the present invention.

FIELD OF THE INVENTION

This invention relates to lens terminations for optical fibres and in particular to terminations of the type that produce an expanded parallel light beam.

SUMMARY OF THE INVENTION

According to the invention, there is provided an optical fibre termination for an optical fibre, including a lens, and means for mounting a bared fibre end adjacent the lens such that light emitted from the fibre end is refracted into a substantially parallel expanded beam by the lens.

According to another aspect of the invention, there is further provided an optical fibre termination for a coated fibre, including a substantially cylindrical transparent plastics body member having a truncated spherical or aspherical lens formed integral and coaxial therewith, and having a coaxial guide taper adapted to receive a bared fibre end and leading to a central bore which bore locates the fibre end, and in which the central bore and the lens are so arranged that when a fibre is fitted to the termination, light emitted from the fibre end is refracted into a substantially parallel beam by the lens.

According to another aspect of the present invention there is provided a termination for a coated optical fibre, including a converging lens or lens system, and a fibre locating guide pre-adjusted at the focus of the lens or lens system, in which the fibre locating guide is adapted to receive the bared fibre end.

According to another aspect of the present invention there is provided an apparatus for assembling an optical fibre termination of the type in which a fibre end is arranged at the focus of a lens, the apparatus including a base plate having an alignment surface for receiving a connector member to be assembled, a laser light source mounted on the base plate and arranged such that its output beam is in alignment with a connector member placed on the reference surface, a photo-detector for measuring the intensity of light received from the laser via the connector member, and a micropositioner for adjusting the end of a fibre fitted to the connector member such that maximum light intensity is received by the photodetector.

According to another aspect of the present invention there is provided a graded index expanded beam optical fibre termination including a socket having a blind hole for accepting the end of an optical fibre, which hole is aligned with the axis of a radially graded index collimating lens whose length is equal to an odd integral number of quarters of the characteristic sinusoidal wavelength of the lens.

The above follows from the fact that with a radially graded refractive index medium whose refractive index decreases parabolically with distance from the axis, if light rays are launched from a point on the axis of the medium they follow a sinusoidal course that intersects the axis at regular intervals. Following from this, such a medium functions as a lens, and in particular, if the length of the lens is equal to an odd integral number of quarters of the characteristic sinusoidal wavelength, the lens acts as a collimating lens for the two points where the axis intersects the end faces of the lens. Use is made of this fact to form an expanded beam optical fibre termination in which an appropriate length of radially graded index fibre which acts as a lens is butted against the end of an optical fibre to transform the emergent diverging beam of light into a collimated beam of light. To couple two fibres, the lens then directs the light onto a similar lens which focuses the collected light, the collimated beam, onto the face of a further fibre. This effects an optical coupling between the two fibres which is less sensitive to small lateral misalignment of the two lens-terminated parts than would be the case if the fibres were directly butted together. It is however necessary to have the lenses accurately aligned with their respective fibres.

The invention also contemplates an expanded beam terminated optical fibre wherein an end of the fibre terminates inside a socket member with its axis aligned with that of a radially graded index collimating lens forming part of said socket member, wherein the length of the lens is equal to an odd integral number of quarters of the characteristic sinusoidal wavelength of the lens.

Preferably the index grading of the lens extends radially from its axis at least as far or further than the radial dimensions of the hole or fibre.

A preferred way of making such terminations is by a 'collapse sleeve' technique to be described hereinafter. In one form of this technique a portion of the sleeve is collapsed onto a suitable length of graded index lens. In another, a portion of the sleeve is collapsed onto itself, and in this instance the sleeve is one having an index grading that provides the collapsed portion with the properties of a graded index lens.

It should be noted that, as in the case of other expanded beam terminations the arrangements to be described herein can be used for beam splitting and as couplers.

BRIEF DESCRIPTION OF THE DRAWINGS

FIG. 4 is a sectional view of a beam splitter embodiment of the optical fibre termination member of FIG. 2;

FIG. 6 is an embodiment of the termination of FIG. 5 including two pairs of optical fibres;

FIG. 11 is a part schematic diagram of a jig arrangement for preadjusting an optical connector member;

DESCRIPTION OF THE PREFERRED EMBODIMENTS

Figure 1:
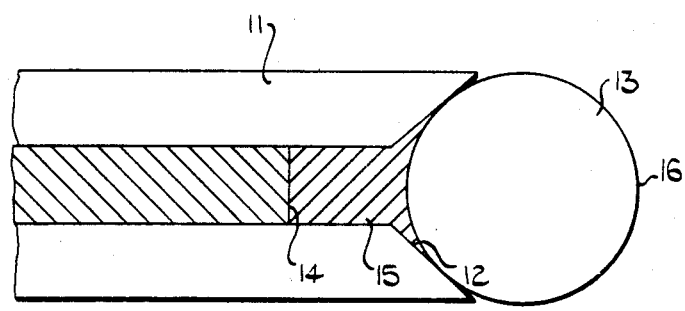
FIG. 1 is a cross-section of the end of a clad optical fibre fitted with a ball lens termination.

Referring to FIG. 1, a ferrule 11 having a very accurate outside diameter, and a moderately accurately centered recess 12 for receiving glass sphere 13 is placed in a pre-aligned holder (e.g. a V-groove) so as to make the ferrule's axis coincide, e.g. with a collimated laser beam. The fibre end 14 is then adjusted to cause maximum transmission through the fibre or reflection from it. This adjustment may be carried out using a ball-bearing as described in British application No. 46743/74 (M. Chown-5), now British Pat. No. 1,508,138. In some applications, the laser beam may be slightly diverging or converging by a predetermined amount to correct for use of a different wavelength from that intended for transmission. Another refinement could be that the aperture is deliberately made large enough so that spherical aberration just causes the fibre to be filled. This allows a more peaked maximum to be achieved than the flat top which would result from line focussing.

In FIG. 1, the space between fibre end 14 and ball lens 13 is filled with a clear substance 15, for example, polyester resin or epoxy, which is an approximate refractive index match to the lens 13. In this case, only one surface 16 of the lens 13 is effectively used. The index match substance should be chosen not to set until the fibre has been adjusted.

Figure 2:
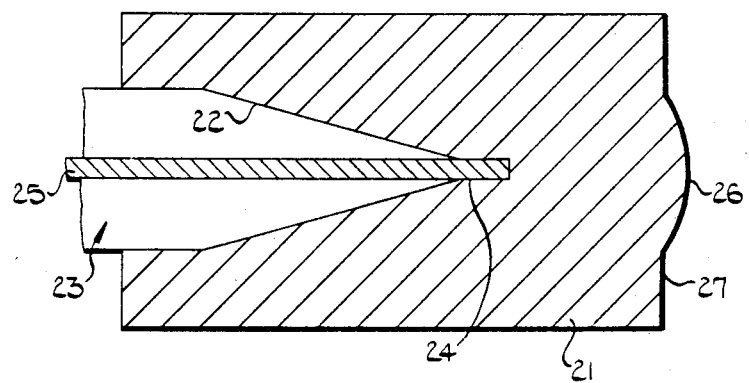
FIG. 2 is a sectional view of a ball lens termination having a guide taper for receiving a clade fibre.

FIG. 2 shows a demountable fibre termination which includes an integral ball lens. The termination includes a transparent cast or molded cylindrical plastics body 21 having a coaxial guide taper 22 adapted to receive the prepared end of a coated optical fibre 23, which fibre may advantageously be of the plastics coated silica type. The guide taper 22 leads to a central bore 24 which receives and locates the bared end 25 of the fibre 23. In some applications the fibre end 25 may be secured in the bore 24 by a refractive index matched adhesive.

The termination is provided with a truncated spherical lens 26 on the end face 27 opposite the taper entry and coaxial with the taper 22 and bore 24. The lens 26 and bore 24 are so arranged that when a fibre end 25 is located in the bore 24, the end of the core is at the optical center of the lens 26, i.e. such that light from the fibre is refracted by the lens 26 into a parallel beam.

Figure 3:
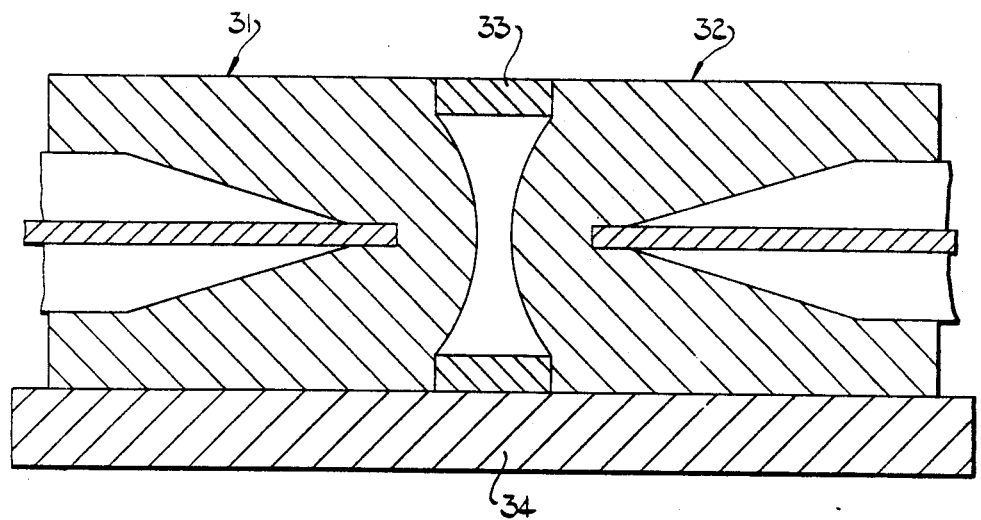
FIG. 3 is a sectional view of a pair of the terminations of FIG. 2 arranged in a coupler assembly.

FIG. 3 shows how a pair of fibre terminations 31 and 32 of the type shown in FIG. 2 may be arranged to form a connector or coupler assembly. The two terminations, which are separated by a spacer ring 33, are mounted on a ferrule 34 which engages a machined or molded surface on each termination so as to maintain the terminations in axial alignment. Due to the beam spreading effect of the ball lenses, however, a small lateral tolerance between the terminations is permissible.

Figure 5:
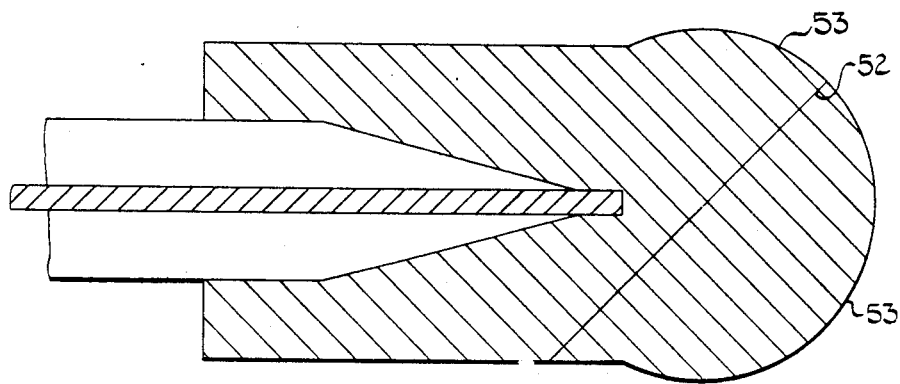
FIG. 5 is a further beam splitter embodiment of the termination of FIG. 2.

FIGS. 4 and 5 show demountable fibre terminations which may be employed as beam splitters or combiners. The beam splitter of FIG. 4 includes a transparent plastics body 41 having a taper guide for receiving an optical fibre. The two integral lenses 42 and 43, which in some applications may be aspherical, produce a pair of diverging beams. The beam splitter of FIG. 5 has a similar plastics body, but has one end of the body cut at an angle of approximately 45° to the body axis, the angled face 52 being half silvered. A lens 53 is formed around the end of the plastics body so as to receive the two light beams produced at the half silvered surface 52.

FIG. 6 shows, in part schematic form, a four way beam splitter/coupler. Optical fibres 61, 63 and 64 are mounted in a coplanar St. George's cross arrangement in a plastics body member. A split ball lens 65 is supported at the center of the cross and is divided into two hemispheres by a partially reflecting layer 67. Light from any one of the optical fibres, e.g. 61, is directed via the partially reflecting layer 67 to the two corresponding fibres.

In some applications, the central bore of the terminations of FIGS. 2 to 6 which receives the fibre core may be provided by an accurately drilled jewel insert. The insert is advantageously secured in the plastics body during the molding or casting process.

Figure 7:
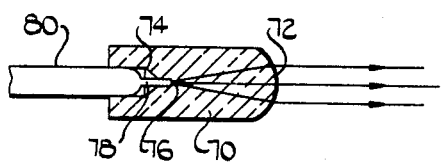
FIG. 7 shows a one piece lens termination for an optical fibre.

Referring to FIG. 7, the lens termination shown comprises a cylindrical body 70 of plastics, e.g. acrylic, material having one end in the form of a convex lens 72. The other end of the body 70 has a guide taper 74 leading to a coaxial bore 76 for locating the bared fibre end 78 of a plastics coated fibre 80 at the focus of the lens 72. In this way, light emitted from the fibre end is refracted into an expanded parallel beam by the lens.

Figure 8:
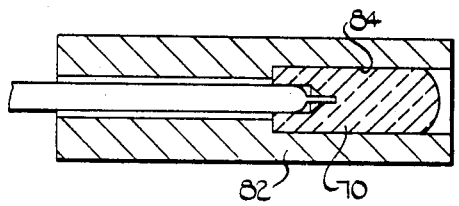
FIG. 8 shows a connector member fitted with a termination of the type of FIG. 7.

FIG. 8 shows the termination arrangement of FIG. 7 mounted in a metal ferrule 82 so as to provide a connector member. The body 70 is a push fit in the bore 84 of the ferrule 82 and is coaxial with the outer surface of the ferrule. The ferrule 82 provides a reference surface whereby the termination may be coupled to a similar termination by means of one or more alignment surfaces.

Figure 9A:
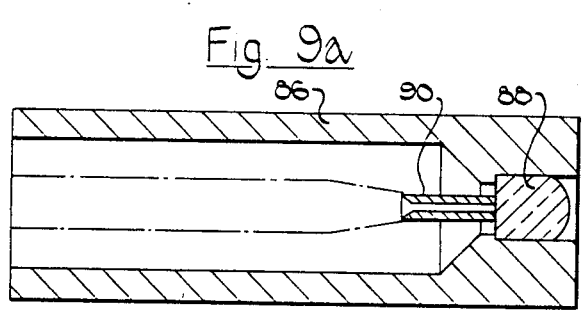
FIGS. 9a to 9d an alternative fibre termination with various preset fibre positioners.

FIGS. 9a to 9d show modifications of the termination arrangement of FIGS. 7 and 8. In FIG. 9a, a ferrule 86 carries a plastics lens insert 88 fitted with a coaxial capillary tube 90 secured to the lens insert 88 with a refractive index matching cement. When the termination is fitted to the prepared end of a coated fibre 80, the capillary tube 90 receives the bared fibre end 78 and the fibre end is located at the lens focus. The coated fibre 80 is supported in the bore of the termination by a cushioning material 92.

Figure 9B:
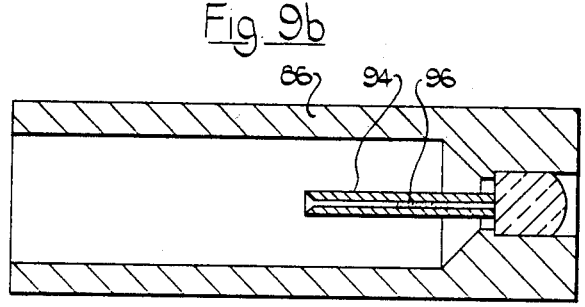

A modification of this capillary tube technique is shown in FIG. 9b, in which an extended tube 94 containing a fibre stub 96 is employed. The fibre stub 96 is held by the tube 94 at the focus of the lens and couples with a bared fibre end inserted in the open end of the tube.

Figure 9C:
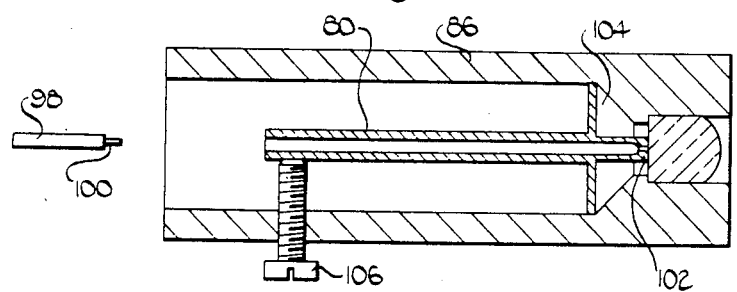
Figure 9D:
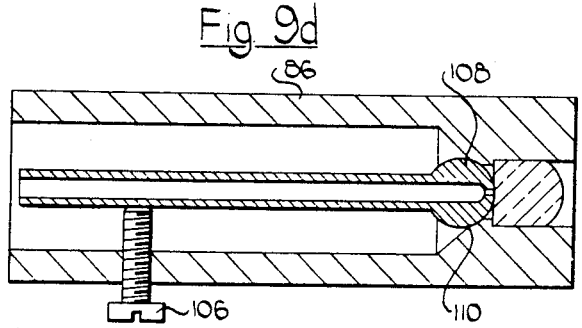

FIGS. 9c and 9d show two forms of adjustable termination arrangements. Both arrangements employ a lever reduction system to effect adjustment of the fibre end at the lens focus. FIG. 9c shows a connector member for terminating a coated fibre 98. The coating is trimmed perpendicular to the fibre axis to expose the fibre end 100 and the prepared fibre is then inserted into a tube 80 mounted along the axis of the ferrule 86. A forward reduced diameter bore portion 102 of the tube 80 receives the bared fibre end and locates it at the focus of the lens 88. The tube 80 is pivoted on a membrane 104 mounted perpendicular to the bore of the ferrule 86.

Angular adjustment of the tube 80 to ensure that the fibre end coincides with the lens focus is effected by screw 106. The lever reduction of movement provided by the relatively long tube 80 permits very fine adjustment of the position of the fibre end.

A similar arrangement is provided in the connector member of FIG. 9d, but in this case the supporting membrane 104 is replaced by a ball 108 formed integral with the tube 80 and pivoting within a forward cone portion 110 of the ferrule 86.

Figure 10:
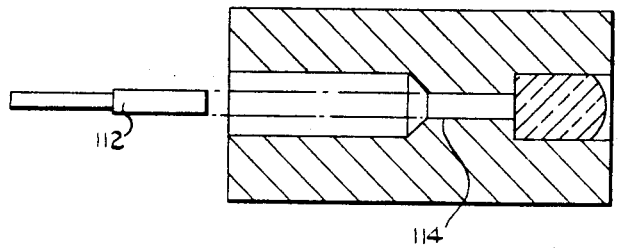
FIG. 10 shows an optical connector member for use with a fibre fitted with a standard jewel termination.

The connector member shown in FIG. 10 is intended for use with a fibre fitted with a standard jewel ended termination 112 such as that described in British application No. 18930/75 (M. J. Phillips-A. M. Crick 3-2), now British Pat. No. 1,480,445. Terminations of this type employ a watch jewel mounted in a ferrule and whose bore receives and locates the fibre end. The connector ferrule has a guide bore 114 for receiving the jewel ferrule.

The connector members shown in FIGS. 7 to 10 may be assembled with the jig arrangement shown schematically in FIG. 11. A rigid mounting plate 116 supports a laser 118 and lens system 120 and has a V groove for positioning a ferrule of a connector member 122 with respect to a parallel light beam produced by the laser and lens system. As shown in FIG. 11, the connector member is of the type shown in FIG. 9b but other connector members may also of course be assembled.

A glass capillary tube 124, mounted in a check 126 of a micropositioner arrangement, is inserted along the bore of the ferrule until it abuts the plane rear surface of the lens of the connector. A droplet of refractive index matching cement is placed between the capillary 124 and the lens. A prepared coated fibre 128 is then inserted down the bore 130 of the chuck 126 so that the bared fibre end 132 enters the bore of the capillary 124. The micropositioner is employed to adjust the axial and longitudinal position of the fibre end to obtain maximum light transmission as recorded by a detector 134 disposed at the remote end of the fibre after which the joint is held steady until the cement has set.

Although the connectors described thus far have been shown fitted with plano-convex lenses, other lens structures may of course be employed. In a particularly advantageous embodiment such a connector employs a cylindrical lens having plane end faces and a graded refractive index. Such lenses are sold under the trade name SELFOC and are made from an optical fibre material constructed so that light travels along the longitudinal axis in a sine wave. A lens made from a quarter wavelength of this material has its foci at its plane surfaces. The inward face of such a lens may, in some applications, be provided with an etched pit for locating the ends of the fibre to which the lens is coupled.

In further applications, a Fresnel lens, which may be molded from a plastics material, may also be employed and may similarly be provided with a locating pit for receiving the fibre end so as to ensure alignment of the fibre with the optical axis of the lens.

Both these types of lenses are particularly suitable for the connector shown in FIG. 10 of the accompanying drawings and which is adapted to couple to a fibre terminated with a watch jewel.

Figure 12:
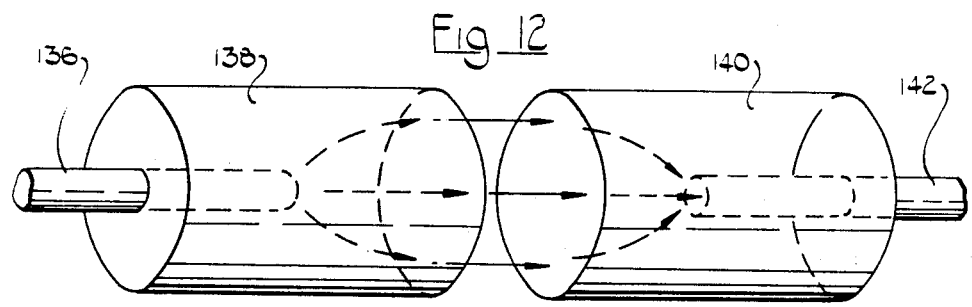
FIG. 12 shows a pair of optically coupled graded index lens terminated optical fibres.

FIG. 12 shows a length of optical fibre 136 terminating inside a socket member 138 whose end portion is constructed by a graded index lens the length of which is assumed to be one quarter of the characteristic sinusoidal wavelength of the lens. The lens therefore converts the divergent beam of light emerging from the fibre end into a collimated beam. This beam is intercepted by a similar socket 140 whose graded index lens focuses the collected light onto the end of a second fibre 142.

The parabolic index grading of the lens may be described by the equation:

$$n = n_o(1 - \tfrac{1}{2}\beta^2 r^2),$$

where $2\pi/\beta$ is the characteristic sinusoidal wavelength of the lens. In this case the radius of the beam launched through a point on the axis of the lens at an angle to the axis is described by the equation:

$$r = h \sin \beta z$$

where z is the distance along the axis, and h is the maximum radius of the beam.

Differentiating this second equation it is seen that 'h' and 'a' are related by the equation:

$$\tan \alpha = \int \left(\frac{dr}{dz}\right)_{z=0} = \beta h.$$

If for a typical fibre having a numerical aperture of 0.18 ($\alpha = 0.12$) the diameter of the expanded beam may be required to be about 400$\mu$ (2h=400$\mu$), in which case $\beta \simeq 0.6$ mm$^{-1}$, and a quarter of the characteristic wavelength (L) is approximately 2.6 mm. Typical tolerances for this would be 10–20$\mu$ in the length of the lens, 4$\mu$ in lateral misalignment of each fibre with respect to its lens axis, 0.1° angular misalignment, and 25$\mu$ in lateral misalignment between the axes of the two lenses.

Figure 13:
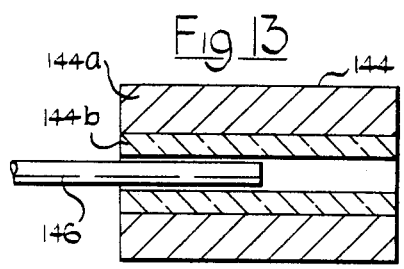
FIGS. 13 and 14 show successive stages in the manufacture of a graded index lens terminated optical fibre.
Figure 14:
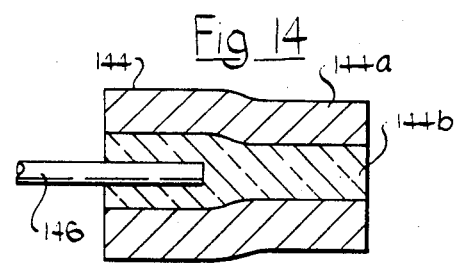

FIGS. 13 and 14 show stages in a preferred method of making a termination using a collapsed sleeve technique employing a sleeve 144 which has a tubular substrate portion 144a whose bore is lined with a lining 144b, the refractive index of which is graded. This sleeve may be made by the method used in an early stage of optical fibre preform manufacture described in British Patent Specification No. 1,427,327, (R. W. J. Uffen 2) in which a succession of layers of progressively changing composition are deposited by a hydrogen free chemical vapor reaction upon the bore of a substrate tube. In particular in the termination of graded index fibre made by this chemical vapor reaction deposition method, it is convenient to derive the fibre and the sleeve from the same or similar stock in order that their numerical apertures may be conveniently matched. The sleeve will not normally be as large in diameter as the original tubular preform, but can be made from the preform by heating the preform so as to cause its bore to shrink under the action of surface tension while it is rotated about its axis to assist preserving its symmetry.

In a typical example a graded index lens termination approximately 400 $\mu$m in diameter was required for a graded index optical silica fibre having an external diameter of 110 $\mu$m and a graded index core 30 $\mu$m in diameter. For this purpose a sleeve having a 120 $\mu$m diameter bore to fit over the fibre end requires the thickness of the lining to be about 150 $\mu$m. If the sleeve is prepared from the same tubular preform stock as the fibre, then the external diameter of the sleeve will be about 1.47 mm.

Normally a drawing operation will be required to prepare the sleeve 144 from the tubular preform since mere partial collapse of its bore at constant length will not provide the required dimensions.

The end of fibre 146 is inserted into the bore of the sleeve 144 to the required depth (FIG. 13) and then the assembly is heated to cause the bore of the sleeve to collapse onto the fibre in the region occupied by the fibre, and to collapse onto itself in the region beyond the fibre (FIG. 3). The proper location of the fibre end within the sleeve may be observed through the sleeve wall with the aid of a microscope, or it may be located by spacing it the appropriate distance from a reference surface with the aid of some form of slip gauge which is then removed before the sleeve end is brought up against the reference surface.

It will be appreciated that the flow of glass round the fibre end will produce a localized region where the refractive index grading is liable to be rather poorly defined. The effect of this will be to make the appropriate depth of insertion of the fibre end to be slightly different from that produced by calculation based on the assumption that the index grading is uniform from the face of the lens right up to the fibre end. The requisite 'correction' factor may be found by experiment and this will normally be substantially constant for similar terminations provided that the collapse conditions are not significantly changed. Fine adjustment may be made with a final polish of the collapsed end face. The fibre around which the sleeve is collapsed may be a relatively short tail suitable for splicing onto the end of a longer length of optical fibre.

Figure 15:
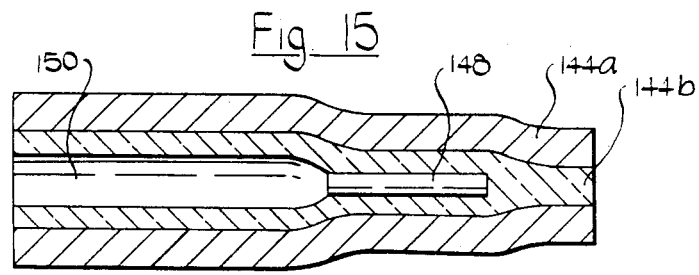
FIGS. 15, 16, and 17 show three different types of graded index lens termination for optical fibres.

Alternatively, the fibre around which the sleeve is collapsed may be, as shown in FIG. 15, a stub 148 that is so short that neither end protrudes from the sleeve. In this instance the sleeve bore is collapsed onto itself beyond only one end of the stub so that a socket 150 is left at the other end into which a fibre (not shown) can subsequently be secured, either with a suitable adhesive such as an ultraviolet light curing index matching adhesive, or by heating this end of the sleeve to collapse it on the fibre.

To provide a coupler, either two devices each as shown in FIG. 14 or 15 are used with their end faces aligned, or a single such device is used with two aligned fibres terminated therein, the distance between the fibre ends after collapse being that appropriate an even number of quarter-wavelength.

Figure 16:
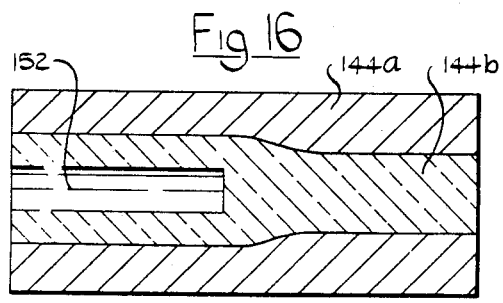

In the arrangement depicted in FIG. 16, the stub of optical fibre has been dispensed with, and instead the sleeve is collapsed onto a mandrel (not shown), for instance of metal, which is then subsequently removed to leave a socket 152. The socket 152 serves the same function as the socket 150 of the previously described embodiment.

Although previous reference has been made to the use of silica for the sleeve, it should be appreciated that such sleeves may alternatively be made of more conventional multicomponent glasses. Since the length of the lens is short compared with the lengths of fibre with which it will normally be used, it will not be necessary for its optical loss per unit length to be as low as that of the fibre. For connecting silica fibre the use of silica sleeve will have the advantages of thermal expansion match, stability, and of a suitably high softening point to facilitate deposition of the graded index lining 144b by a direct oxidation chemical vapor reaction. But the high temperature of the softening point makes the collapsing of the sleeve more difficult, particularly, if this is to be effected in the field. However, since the optical loss per unit length can be higher than that of the fibre it is not necessary to employ a hydrogen-free deposition reaction and so a lower temperature reaction can be chosen than that of the direct oxidation reaction preferred for the manufacture of the fibre.

Figure 17:
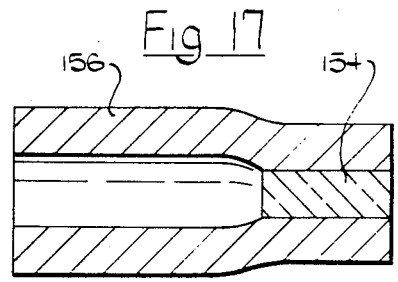

In each of the embodiments so far described, the graded index lens has been formed by a portion of the sleeve itself. In an alternative method of construction the lens is originally a discrete integer which is fitted into the bore of a sleeve and then secured in position by collapsing the surrounding sleeve onto the curved surface of the lens. This produces a structure of the type depicted in FIG. 17 in which a graded index lens 154 is secured at one end of a glass sleeve 156. The lens diameter may be slightly smaller or slightly larger than the fibre diameter, but needs to be more closely matched than is the case in the previously described embodiment.

The more restricted beam expansion requires a steeper grading of index and hence a shorter characteristic wavelength of the lens in order to retain the same numerical aperture. Thus, in order to obtain the same numerical aperture for a graded index lens of only 120 $\mu$m diameter it is necessary to strengthen the lens so that a quarter of its characteristic wavelength is reduced from about 2.6 mm to about 0.8 mm. This may be considered rather short to ensure adequate angular alignment of the lens within the collapsed portion of the sleeve, and therefore it may be preferred to use a lens whose length is a small odd integral number of quarters of the characteristic wavelength in order to increase the slenderness ratio of the lens.

Thus in a typical example of termination for a 100 $\mu$m external diameter fibre with a 30 $\mu$m diameter graded index core whose numerical aperture is 0.18, the sleeve may be about 15 mm long while the lens is made ¾ or 5/4 of the characteristic wavelength of refractive index profile. These dimensions must be kept to a strict tolerance in order to preserve the same quality of imaging.

Reflection loss at the end face of the termination can be reduced by providing it with a reflection-reducing interference coating, but this will not be required if terminated fibres are to be optically coupled by butting their end faces together to form an interface quality join. Alternatively, if the fibres are to be coupled in a manner involving the spacing of the end faces from each other, this space can advantageously be filled with an index matching medium.

Any form of connector for effecting an optical coupling between one or more pairs of these terminated fibres can make use of known methods of achieving butt joints. The expansion of the beam diameter has the effect of making the lateral alignment tolerance less severe at the expense of a more stringent angular alignment requirement. Providing that the termination end faces are accurately normal to their axes, the necessary angular alignment can be achieved simply by butting their end faces together to form a fit of interface quality.

In the above described examples the numerical aperture of each lens termination was designed to match that of its fibre but for some applications it may be desirable to choose a smaller numerical aperture for the lens in order that it shall act as a filter to reject certain of the higher order modes that would otherwise be launched into the next fibre.

I claim:

1. A graded index expanded beam optical fibre termination, including a socket having a blind hole for accepting the end of an optical fibre, which hole is aligned with the axis of a radially graded index collimating lens whose length is equal to an odd integral number of quarters of the characteristic sinusoidal wavelength of the lens, wherein said socket is formed by collapsing a sleeve of a radially graded index material about the end of a fibre to be terminated, the radially graded index material beyond the end of the fibre end forming the lens.

2. A termination as claimed in claim 1, and wherein the radially graded index material sleeve is on the inside of a substrate sleeve which is collapsed with the firstmentioned sleeve.

3. An optical fibre coupler which includes two terminations each as claimed in claim 2 with their nonblind hole end faces parallel with and adjacent to each other.

4. A termination as claimed in claim 1, modified in that two fibres are fitted into opposite ends of a said sleeve of said radially graded index material, the length of the sleeve being such that the distance between the fibre ends after the collapse is substantially equal to an even number of said quarter wavelength.

5. An optical fibre coupler which includes two terminations each as claimed in claim 1 with their nonblind hole end faces parallel with and adjacent to each other.

6. A graded index expanded beam optical fibre termination, including a socket having a blind hole for accepting the end of an optical fibre, which hole is aligned with the axis of a radially graded index collimating lens whose length is equal to an odd integral number of quarters of the characteristic sinusoidal wavelength of the lens, wherein said socket is formed by collapsing a sleeve of a radially graded index material about a stub of an optical fibre in such manner that the blind hole is left at one end of the stub and axially aligned therewith, and wherein the material of the sleeve at the other end of the stub forms the lens.

7. A termination as claimed in claim 6, and wherein the radially graded index material is on the inside of a substrate sleeve which is collapsed with the firstmentioned sleeve.

8. An optical fibre coupler which includes two terminations each as claimed in claim 3, with their non-blind hole end faces parallel with and adjacent to each other.

9. An optical fibre coupler which includes two terminations each as claimed in claim 6, with their nonblind hole end faces parallel with and adjacent to each other.

10. A graded index expanded beam optical fibre termination, including a socket having a blind hole for accepting the end of an optical fibre, which hole is aligned with the axis of a radially graded index collimating lens whose length is equal to an odd integral number of quarters of the characteristics sinusoidal wavelength of the lens, wherein said lens is a stub of a radially graded index material where length is equal to an odd integral number of said quarter-wavelength about which there is collapsed a sleeve of a suitable glass, such that a socket is left at one end of the sleeve, which socket is axially aligned with the stub, and wherein the opposite end face of the stub and the associated end of the sleeve are co-planar.

11. An optical fibre termination comprising:
a cylindrical body member having a spherical lens formed integral and coaxial therewith, said lens being cleaved by a semi-reflection plane to provide a beam-splitting effect;
a guide taper coaxial within said body member and terminating in a central bore, whereby light emitted from said fibre end is refracted into a parallel beam upon transmission through said lens.

* * * * *